(12) United States Patent
Ma et al.

(10) Patent No.: US 11,785,022 B2
(45) Date of Patent: Oct. 10, 2023

(54) BUILDING A MACHINE LEARNING MODEL WITHOUT COMPROMISING DATA PRIVACY

(71) Applicant: Zscaler, Inc., San Jose, CA (US)

(72) Inventors: Changsha Ma, Campbell, CA (US); Dianhuan Lin, Sunnyvale, CA (US); Rex Shang, Los Altos, CA (US); Douglas A. Koch, Santa Clara, CA (US); Dong Guo, San Jose, CA (US); Howie Xu, Palo Alto, CA (US)

(73) Assignee: Zscaler, Inc., San Jose, CA (US)

( * ) Notice: Subject to any disclaimer, the term of this patent is extended or adjusted under 35 U.S.C. 154(b) by 238 days.

(21) Appl. No.: 16/902,707

(22) Filed: Jun. 16, 2020

(65) Prior Publication Data
US 2021/0392147 A1    Dec. 16, 2021

(51) Int. Cl.
H04L 9/40       (2022.01)
G06N 20/00     (2019.01)

(52) U.S. Cl.
CPC ......... H04L 63/1416 (2013.01); G06N 20/00 (2019.01); H04L 63/145 (2013.01); H04L 63/1425 (2013.01)

(58) Field of Classification Search
None
See application file for complete search history.

(56) References Cited

U.S. PATENT DOCUMENTS 9,152,789 B2   10/2015  Natarajan et al.
9,864,956 B1 *  1/2018  Sai ........................... G06N 3/02
2008/0147576 A1 * 6/2008  Serizawa ................. G06N 3/08
                                                     706/12
2014/0090061 A1 * 3/2014  Avasarala ............. G06F 21/566
                                                     726/24
2014/0181975 A1 * 6/2014  Spernow ............... G06F 21/562
                                                     726/23
2015/0089647 A1 * 3/2015  Palumbo ................. G06F 21/53
                                                     726/23

(Continued)

OTHER PUBLICATIONS

Jordaney, Roberto, et al. "Transcend: Detecting concept drift in malware classification models." 26th {USENIX} Security Symposium ({USENIX} Security 17). 2017.

(Continued)

*Primary Examiner* — Farid Homayounmehr
*Assistant Examiner* — Mudasiru K Olaegbe
(74) *Attorney, Agent, or Firm* — Baratta Law PLLC; Lawrence A. Baratta, Jr.; Ryan Odessa (57) ABSTRACT

Systems and methods include obtaining file identifiers associated with files in production data; obtaining lab data from one or more public repositories of malware samples based on the file identifiers for the production data; and utilizing the lab data for training a machine learning process for classifying malware in the production data. The obtaining file identifiers can be based on monitoring of users associated with the files, and only the file identifiers are maintained based on the monitoring. The lab data can include samples from the one or more public repositories matching the corresponding file identifiers for the production data. The lab data can include samples from the one or more public repositories that have features closely related to features of the production data.

20 Claims, 8 Drawing Sheets

(56) References Cited

U.S. PATENT DOCUMENTS

| | | | | |
|---|---|---|---|---|
| 2016/0078358 | A1* | 3/2016 | Baveja | G06N 5/048 706/52 |
| 2017/0180418 | A1* | 6/2017 | Shen | H04L 63/1466 |
| 2017/0223046 | A1* | 8/2017 | Singh | H04L 63/1491 |
| 2017/0262633 | A1* | 9/2017 | Miserendino | G06N 5/025 |
| 2018/0115570 | A1* | 4/2018 | Ollmann | H04L 63/145 |
| 2018/0293381 | A1* | 10/2018 | Tseng | G06N 20/20 |
| 2018/0308237 | A1* | 10/2018 | Seong | G06F 18/40 |
| 2018/0351972 | A1* | 12/2018 | Yu | H04L 63/1416 |
| 2018/0365372 | A1* | 12/2018 | Araya | G16B 40/00 |
| 2019/0217340 | A1* | 7/2019 | Bertuccelli | G06N 3/088 |
| 2019/0266297 | A1* | 8/2019 | Krause | G05B 23/0245 |
| 2020/0008725 | A1* | 1/2020 | Bach | A61B 5/369 |
| 2020/0285737 | A1* | 9/2020 | Kraus | G06F 21/552 |
| 2020/0327600 | A1* | 10/2020 | Yilmazcoban | G06Q 50/01 |
| 2020/0372153 | A1* | 11/2020 | Thakkar | G06F 21/568 |
| 2021/0019408 | A1* | 1/2021 | Chrysaidos | G06F 21/566 |
| 2021/0256127 | A1* | 8/2021 | Miserendino | G06F 21/564 |

OTHER PUBLICATIONS

Kantchelian, Alex, J. D. Tygar, and Anthony Joseph. "Evasion and hardening of tree ensemble classifiers." International Conference on Machine Learning. 2016.

Tolomei, Gabriele, et al. "Interpretable predictions of tree-based ensembles via actionable feature tweaking." Proceedings of the 23rd ACM SIGKDD International Conference on Knowledge Discovery and Data Mining. ACM, 2017.

* cited by examiner

BUILDING A MACHINE LEARNING MODEL WITHOUT COMPROMISING DATA PRIVACY

FIELD OF THE DISCLOSURE

The present disclosure relates generally to networking and computing. More particularly, the present disclosure relates to systems and methods for building a Machine Learning model without compromising data privacy.

BACKGROUND OF THE DISCLOSURE

Network and computer security can be addressed via security appliances, software applications, cloud services, and the like. Each of these approaches is used to protect end users and their associated tenants (i.e., corporations, enterprises, organizations, etc. associated with the end users) with respect to malware detection, intrusion detection, threat classification, user or content risk, detecting malicious clients or bots, phishing detection, Data Loss Prevention (DLP), and the like. Also, Machine Learning (ML) techniques are proliferating and offer many use cases. In security, there are various use cases for machine learning such as malware detection, identifying malicious files for further processing such as in a sandbox, user or content risk determination, intrusion detection, phishing detection, etc. The general process includes training where a machine learning model is trained on a dataset, e.g., data including malicious and benign content or files, and, once trained, the machine learning model is used in production to classify unknown content based on the training.

An example cloud security service is Zscaler Internet Access (ZIA), available from the assignee and applicant of the present disclosure. ZIA provides a Secure Web and Internet Gateway that, among other things, processes outbound traffic from thousands of tenants and millions of end users. For example, ZIA can process tens or hundreds of billions of transactions or more a day, including full inspection of encrypted traffic, millions to billions of files every day. This production data (i.e., real tenant traffic) include thousands of malicious files each data, including a non-negligible amount of zero-day (new, unidentified malware) and new malware variants. An important operational aspect of ZIA (and other cloud services, applications, appliances, etc.) is data privacy. Specifically, in ZIA, data content is not persisted once inspected. Here, data traffic (e.g., packets, files, etc.) are analyzed by the cloud service in memory and the computational resources of the nodes in the cloud service are devoted to traffic processing. As opposed to online training, etc. Further, tenants simply do not want their production data stored or maintained outside of their control.

Given the inability to maintain production data or to use the production data in real-time, the biggest challenge in building a machine learning model is the availability of production data for a training dataset. One solution may be to use lab data for training. However, as expected, lab data does not match production data, leaning to poor training of a machine learning model.

There is a need to build a machine learning model for use in production, using production data, while simultaneously respecting and maintaining the privacy of tenants in the production data.

BRIEF SUMMARY OF THE DISCLOSURE

The present disclosure relates to systems and methods for building a Machine Learning model without compromising data privacy. Specifically, the present disclosure provides a technique to develop a training data set for a machine learning model using lab or publicly available file samples to match production data effectively. The use of lab or publicly available file samples is performed because it is not possible (or advisable) to use the production data as the underlying files are not saved for privacy concerns. Thus, the present disclosure provides a technique to have a training dataset that effectively matches production data without using the actual production data. The present disclosure weighs lab or publicly available file samples based on their similarities to production data. In operation, it was determined that this approach improves the recall of malicious Windows executable detection by 10% while maintaining the same precision.

Systems and methods include obtaining file identifiers associated with files in production data; obtaining lab data from one or more public repositories of malware samples based on the file identifiers for the production data, and utilizing the lab data for training a machine learning process for classifying malware in the production data. The obtaining file identifiers can be based on monitoring of users associated with the files, and the files are stored based on the monitoring. The lab data can include samples from the one or more public repositories matching the corresponding file identifiers for the production data. The lab data can include samples from the one or more public repositories that have features closely related to features of the production data.

BRIEF DESCRIPTION OF THE DRAWINGS

The present disclosure is illustrated and described herein with reference to the various drawings, in which like reference numbers are used to denote like system components/method steps, as appropriate, and in which:

FIG. 3 is a block diagram of a server that may be used in the cloud-based system of FIGS. 1 and 2 or the like;

FIG. 4 is a block diagram of a user device that may be used with the cloud-based system of FIGS. 1 and 2 or the like;

DETAILED DESCRIPTION OF THE DISCLOSURE

Again, the present disclosure relates to systems and methods for building a Machine Learning model without compromising data privacy. Specifically, the present disclosure provides a technique to develop a training data set for a machine learning model using lab or publicly available file samples to match production data effectively. The use of lab or publicly available file samples is performed because it is not possible (or advisable) to use the production data as the underlying files are not saved for privacy concerns. Thus, the present disclosure provides a technique to have a training dataset that effectively matches production data without using the actual production data. The present disclosure weighs lab or publicly available file samples based on their similarities to production data. In operation, it was determined that this approach improves the recall of malicious Windows executable detection by 10% while maintaining the same precision.

Example Cloud-Based System

Figure 1:
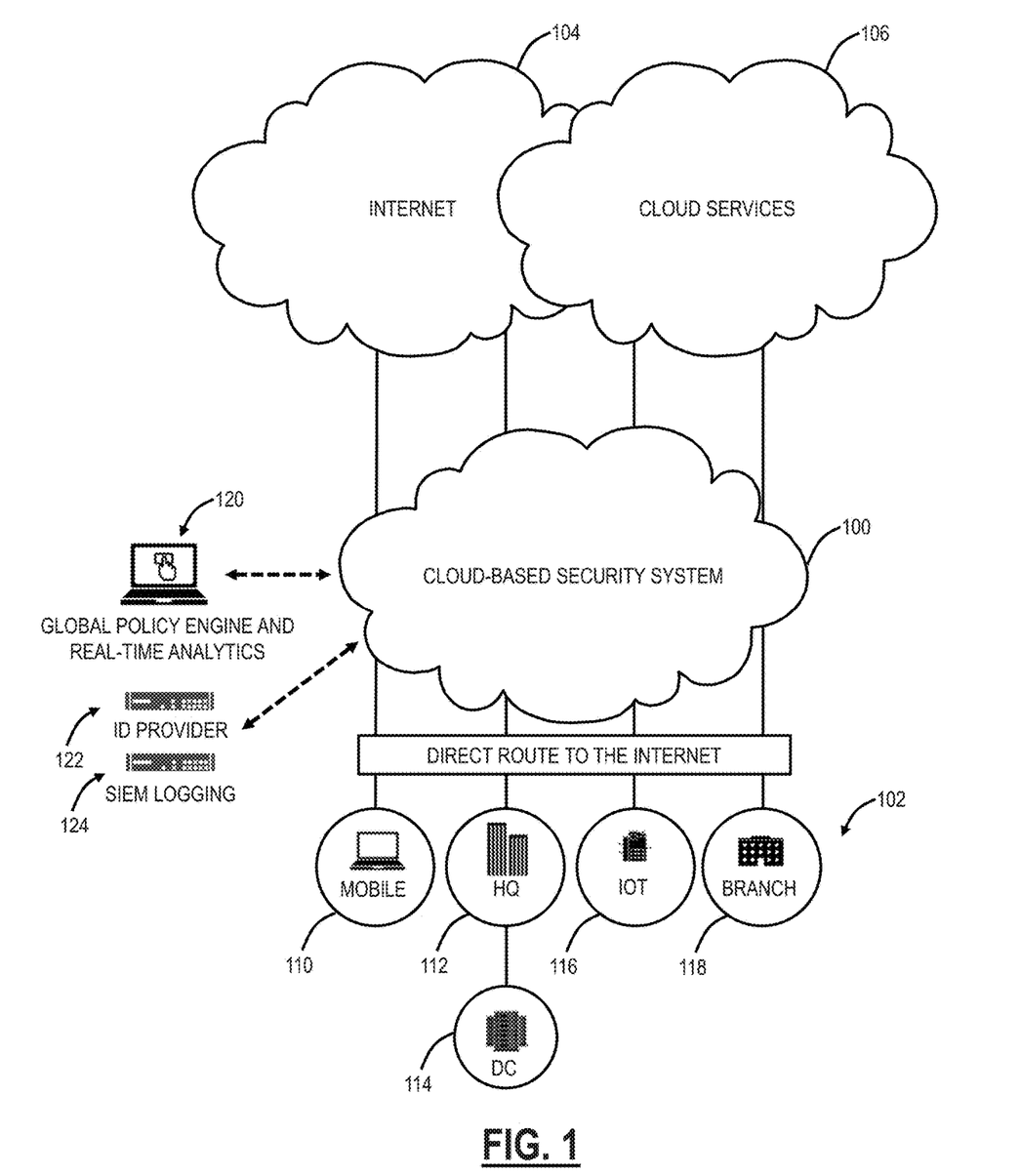
FIG. 1 is a network diagram of a cloud-based system offering security as a service.

FIG. 1 is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, anti-malware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

Figure 3:
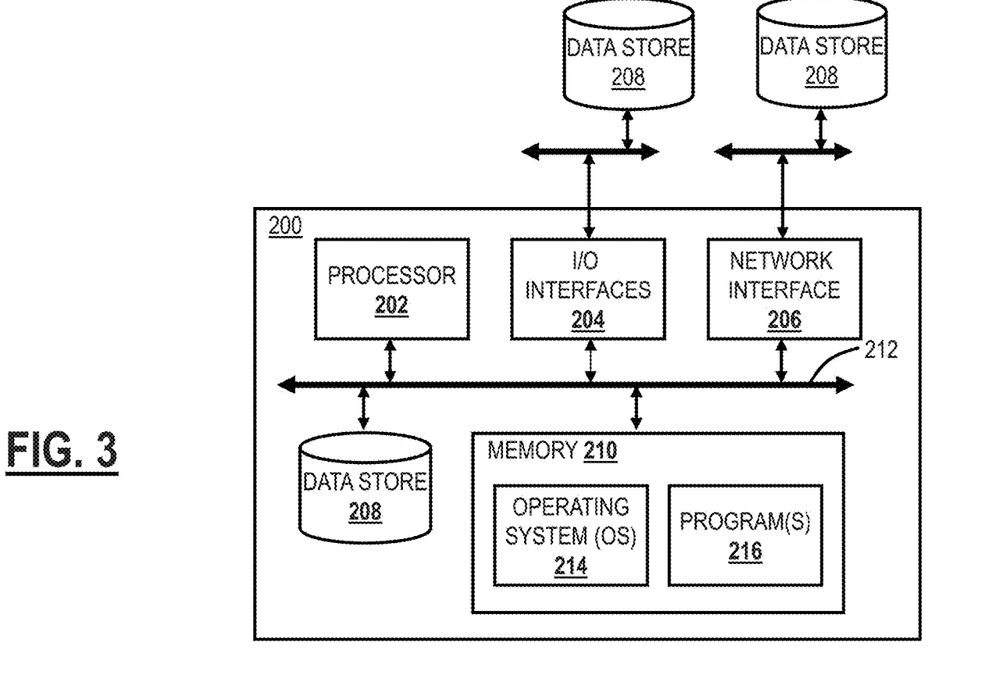

For illustration purposes, the users 102 of the cloud-based system 100 can include a mobile device 110, a headquarters (H.Q.) 112 which can include or connect to a data center (DC) 114, Internet of Things (IoT) devices 116, a branch office/remote location 118, etc., and each includes one or more user devices (an example user device 300 is illustrated in FIG. 3). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes—they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 106) and the Internet 104 and the cloud services 106. Previously, the I.T. deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise I.T. administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as Generic Routing Encapsulation (GRE), Layer Two Tunneling Protocol (L2TP), Internet Protocol (I.P.) Security (IPsec), customized tunneling protocols, etc. The devices 110, 116 can use a local application that forwards traffic, a proxy such as via a Proxy Auto-Config (PAC) file, and the like. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables I.T. administrators to have a unified view of user activity, threat intelligence, application usage, etc. For example, I.T. administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Figure 2:
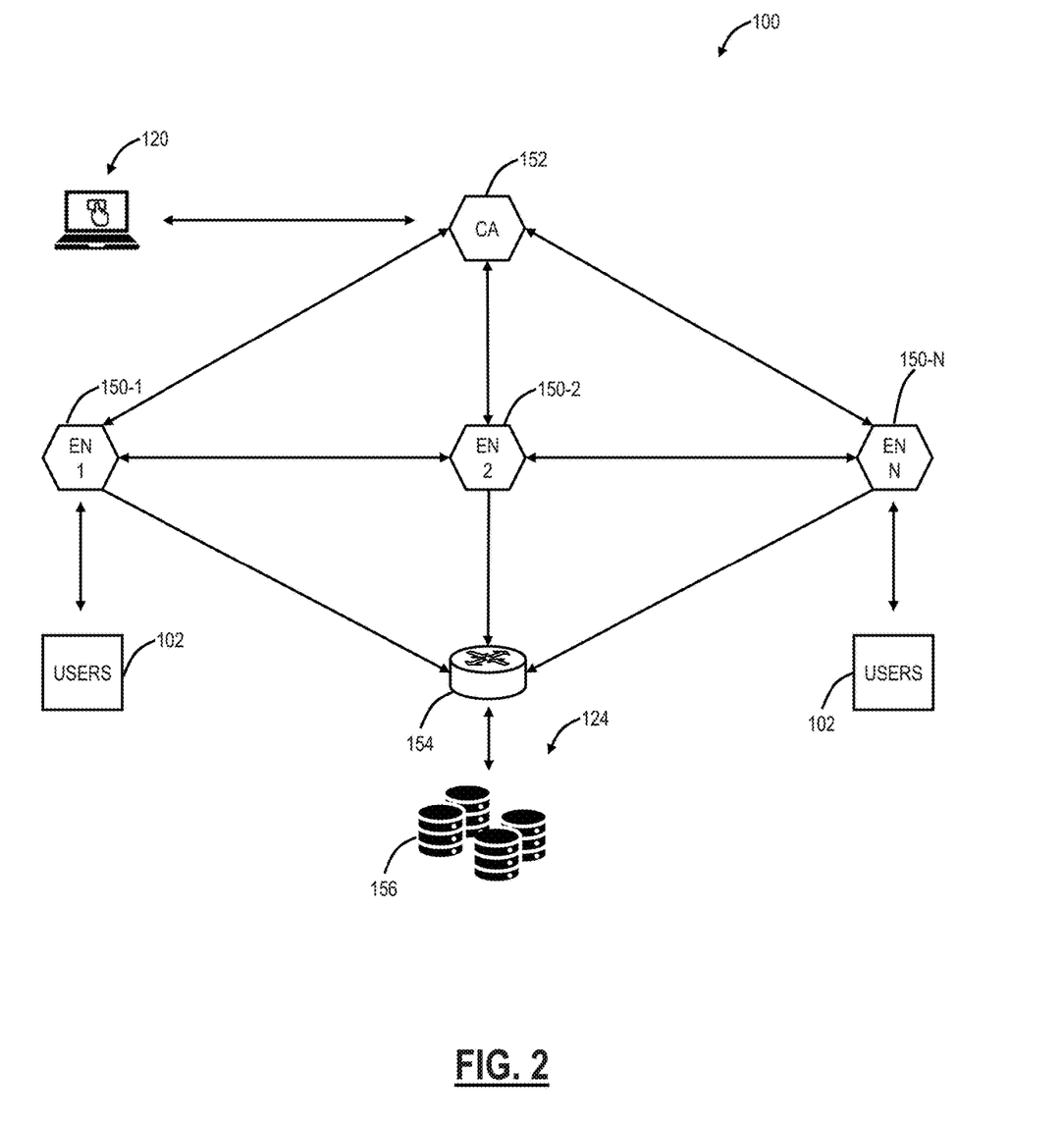
FIG. 2 is a network diagram of an example implementation of the cloud-based system.

FIG. 2 is a network diagram of an example implementation of the cloud-based system 100. In an embodiment, the cloud-based system 100 includes a plurality of enforcement nodes (EN) 150, labeled as enforcement nodes 150-1, 150-2, 150-N, interconnected to one another and interconnected to a central authority (CA) 152. The nodes 150, 152, while described as nodes, can include one or more servers, including physical servers, virtual machines (V.M.) executed on physical hardware, etc. That is, a single node 150, 152 can be a cluster of devices. An example of a server is illustrated in FIG. 2. The cloud-based system 100 further includes a log router 154 that connects to a storage cluster 156 for supporting log maintenance from the enforcement nodes 150. The central authority 152 provide centralized policy, real-time threat updates, etc. and coordinates the distribution of this data between the enforcement nodes 150. The enforcement nodes 150 provide an onramp to the users 102 and are configured to execute policy, based on the central authority 152, for each user 102. The enforcement nodes 150 can be geographically distributed, and the policy for each user 102 follows that user 102 as he or she connects to the nearest (or other criteria) enforcement node 150.

The enforcement nodes 150 are full-featured secure internet gateways that provide integrated internet security. They inspect all web traffic bi-directionally for malware and enforce security, compliance, and firewall policies, as described herein. In an embodiment, each enforcement node 150 has two main modules for inspecting traffic and applying policies: a web module and a firewall module. The enforcement nodes 150 are deployed around the world and can handle hundreds of thousands of concurrent users with millions of concurrent sessions. Because of this, regardless of where the users 102 are, they can access the Internet 104 from any device, and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100, and the enforcement nodes 150 can be configured never to store any data to disk. Packet data is held in memory for inspection and then, based on policy, is either forwarded or dropped. Log data generated for every transaction is compressed, tokenized, and exported over secure TLS connections to the log routers 154 that direct the logs to the storage cluster 156, hosted in the appropriate geographical region, for each organization. As described herein, the customer traffic can be referred to as production data, i.e., live, real traffic processed by the cloud-based system 100. Again, this production data is not maintained for privacy reasons. That is, the actual file data is not maintained, but other aspects are retained in the log data, such as unique file identifiers (e.g., Message Digest 5 (MD5) hash), time, I.P. address, etc.

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 to download all policy configurations. When a new user connects to an enforcement node 150, a policy request is sent to the central authority 152 through this connection. The central authority 152 then calculates the policies that apply to that user 102 and sends the policy to the enforcement node 150 as a highly compressed bitmap.

Once downloaded, a tenant's policy is cached until a policy change is made in the management system 120. When this happens, all of the cached policies are purged, and the enforcement nodes 150 request the new policy when the user 102 next makes a request. In an embodiment, the enforcement node 150 exchange "heartbeats" periodically, so all enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). The ZIA service can provide the access control, threat prevention, and data protection described above with reference to the cloud-based system 100. ZPA can include access control, micro-service segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

Example Server Architecture

FIG. 3 is a block diagram of a server 200, which may be used in the cloud-based system 100, in other systems, or standalone. For example, the enforcement nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

Figure 4:
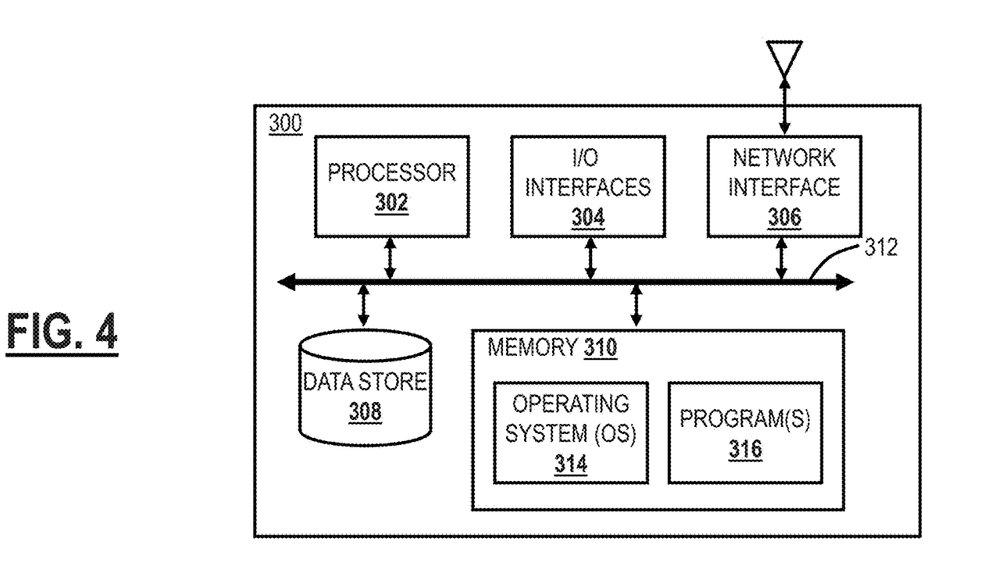

FIG. 4 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IoT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 4 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (L.C. D), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

User Device Application for Traffic Forwarding and Monitoring

Figure 5:
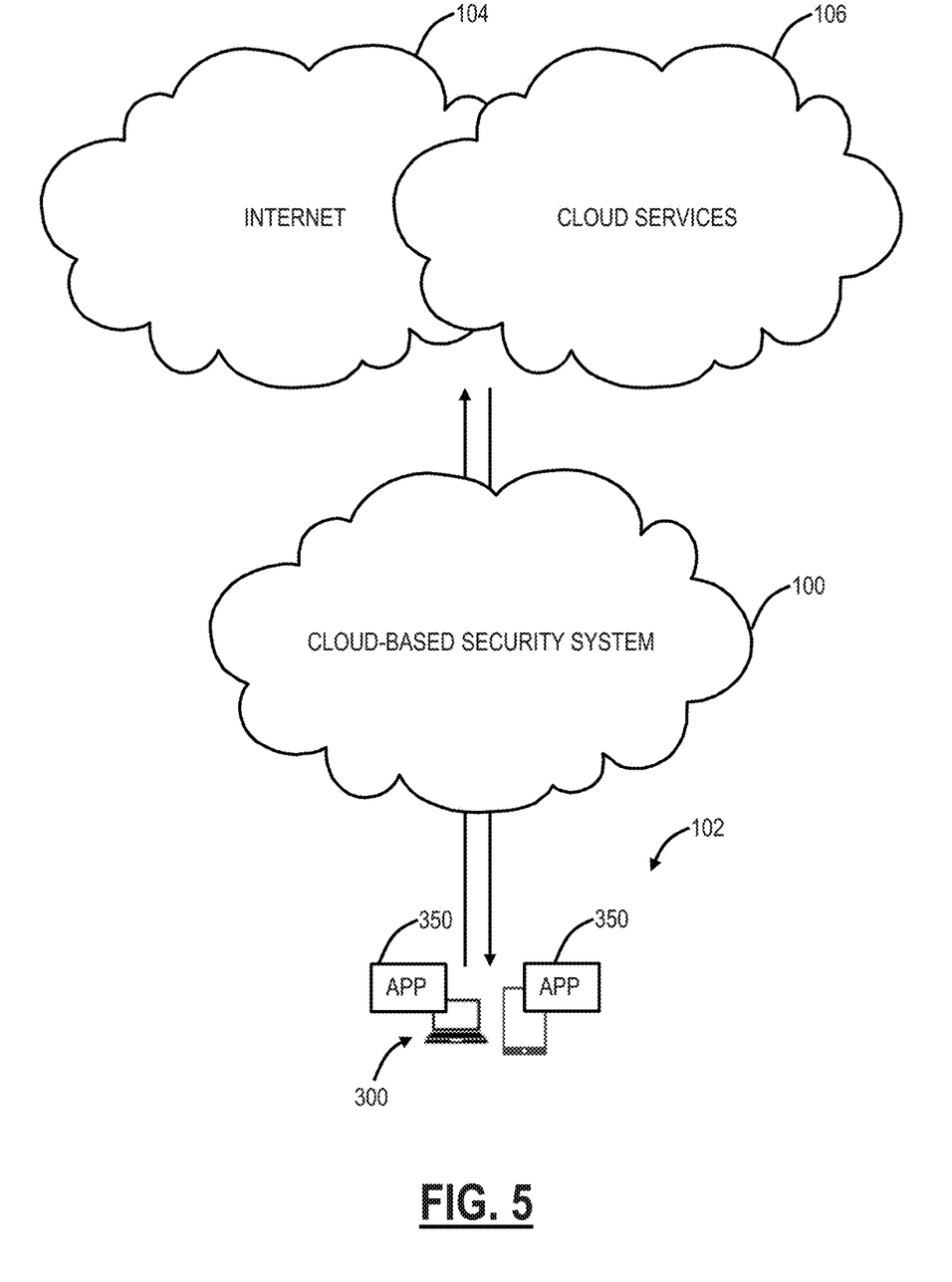
FIG. 5 is a network diagram of the cloud-based system illustrating an application on user devices with users configured to operate through the cloud-based system.

FIG. 5 is a network diagram of the cloud-based system 100 illustrating an application 350 on user devices 300 with users 102 configured to operate through the cloud-based system 100. Different types of user devices 300 are proliferating, including Bring Your Own Device (BYOD) as well as IT-managed devices. The conventional approach for a user device 300 to operate with the cloud-based system 100 as well as for accessing enterprise resources includes complex policies, VPNs, poor user experience, etc. The application 350 can automatically forward user traffic with the cloud-based system 100 as well as ensuring that security and access policies are enforced, regardless of device, location, operating system, or application. The application 350 automatically determines if a user 102 is looking to access the open Internet 104, a SaaS app, or an internal app running in public, private, or the datacenter and routes mobile traffic through the cloud-based system 100. The application 350 can support various cloud services, including ZIA, ZPA, ZDX, etc., allowing the best in class security with zero trust access to internal apps.

The application 350 is configured to auto-route traffic for a seamless user experience. This can be protocol as well as application-specific, and the application 350 can route traffic with a nearest or best fit enforcement node 150. Further, the application 350 can detect trusted networks, allowed applications, etc. and support secure network access. The application 350 can also support the enrollment of the user device 300 before accessing applications. The application 350 can uniquely detect the users 102 based on fingerprinting the user device 300, using criteria like device model, platform, operating system, etc. The application 350 can support Mobile Device Management (MDM) functions, allowing I.T. personnel to deploy and manage the user devices 300 seamlessly. This can also include the automatic installation of client and SSL certificates during enrollment. Finally, the application 350 provides visibility into device and app usage of the user 102 of the user device 300.

The application 350 supports a secure, lightweight tunnel between the user device 300 and the cloud-based system 100. For example, the lightweight tunnel can be HTTP-based. With the application 350, there is no requirement for PAC files, an IPSec VPN, authentication cookies, or end user 102 setup.

Zero Trust Network Access Using the Cloud-Based System

Figure 6:
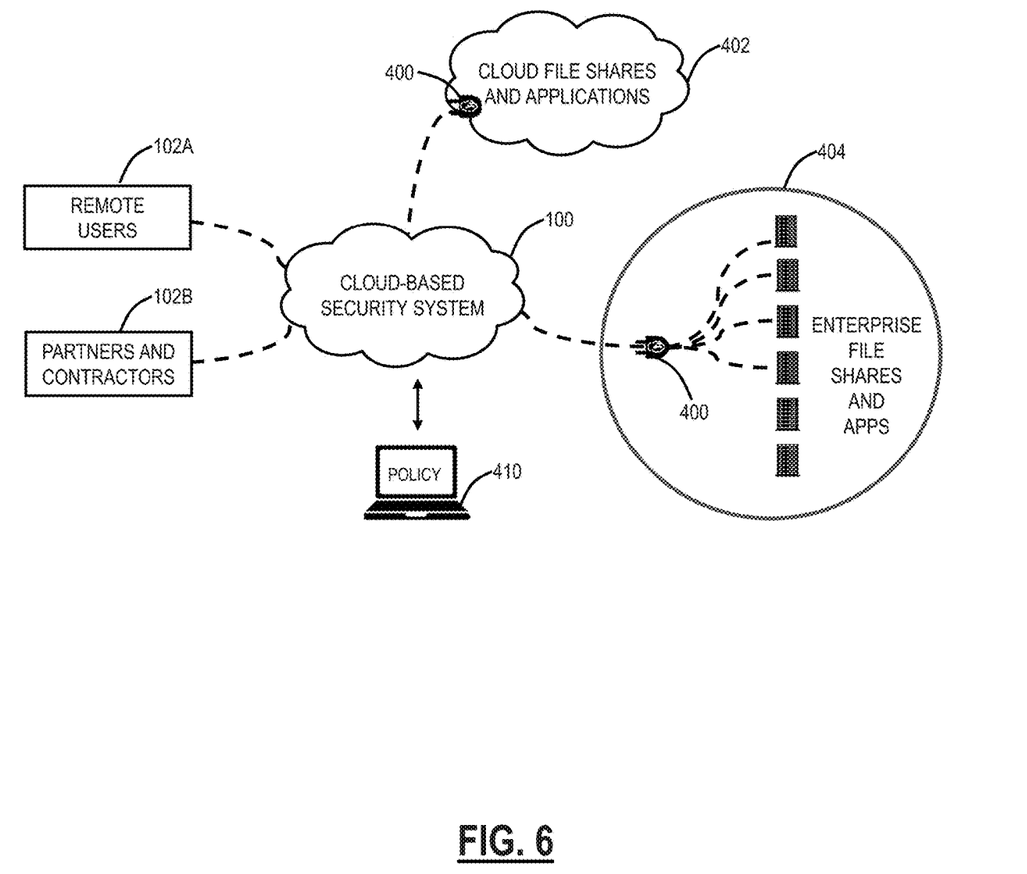
FIG. 6 is a network diagram of a Zero Trust Network Access (ZTNA) application utilizing the cloud-based system of FIGS. 1 and 2.

FIG. 6 is a network diagram of a Zero Trust Network Access (ZTNA) application utilizing the cloud-based system 100. For ZTNA, the cloud-based system 100 can dynamically create a connection through a secure tunnel between an endpoint (e.g., users 102A, 102B) that are remote and an on-premises connector 400 that is either located in cloud file shares and applications 402 and/or in an enterprise network 404, connected to enterprise file shares and applications. The connection between the cloud-based system 100 and on-premises connector 400 is dynamic, on-demand, and orchestrated by the cloud-based system 100. A key feature is its security at the edge—there is no need to punch any holes in the existing on-premises firewall. The connector 400 inside the enterprise (on-premises) "dials out" and connects to the cloud-based system 100 as if too were an endpoint. This on-demand dial-out capability and tunneling authenticated traffic back to the enterprise is a key differentiator for ZTNA. Also, this functionality can be implemented in part by the application 350 on the user device 300.

The paradigm of virtual private access systems and methods is to give users network access to get to an application and/or file share, not to the entire network. If a user is not authorized to get the application, the user should not be able even to see that it exists, much less access it. The virtual private access systems and methods provide an approach to deliver secure access by decoupling applications 402, 404 from the network, instead of providing access with a connector 400, in front of the applications 402, 404, an application on the user device 300, a central authority node 152 to push policy 410, and the cloud-based system 100 to stitch the applications 402, 404 and the software connectors 402, 404 together, on a per-user, per-application basis.

With the virtual private access, users can only see the specific applications 402, 404 allowed by the policy 410. Everything else is "invisible" or "dark" to them. Because the virtual private access separates the application from the network, the physical location of the application 402, 404 becomes irrelevant—if applications 402, 404 are located in more than one place, the user is automatically directed to the instance that will give them the best performance. The virtual private access also dramatically reduces configuration complexity, such as policies/firewalls in the data centers. Enterprises can, for example, move applications to Amazon Web Services or Microsoft Azure, and take advantage of the elasticity of the cloud, making private, internal applications behave just like the marketing leading enterprise applications. Advantageously, there is no hardware to buy or deploy, because the virtual private access is a service offering to end-users and enterprises. FIG. 6 can include the ZPA service from Zscaler, Inc.

ZTNA and CASB Production Data

Also, the ZTNA application and CASB functionality can be combined with the cloud-based system 100 for file monitoring. For CASB, the cloud-based system is between the users 102 and the cloud services 106 for monitoring activity, enforcing security policies, and analyzing traffic. Thus, the ZTNA and CASB applications also have visibility of production data. As described herein, the cloud-based system 100 simply cannot store any content from the ZTNA and CASB applications for tenant privacy. That is, the ZTNA and CASB applications are used for secure access to sensitive tenant resources, and it is simply not possible to retain this production data or to use this production data for any purpose other than the monitoring.

Machine Learning in Network Security

Machine learning can be used in various applications, including malware detection, intrusion detection, threat classification, the user or content risk, detecting malicious clients or bots, etc. In a particular use case, machine learning can be used on a content item, e.g., a file, to determine if further processing is required during inline processing in the cloud-based system 100. For example, machine learning can be used in conjunction with a sandbox to identify malicious files. A sandbox, as the name implies, is a safe environment where a file can be executed, opened, etc. for test purposes to determine whether the file is malicious or benign. It can take a sandbox around 10 minutes before it is fully determined whether the file is malicious or benign.

Machine learning can determine a verdict in advance before a file is sent to the sandbox. If a file is predicted as benign, it does not need to be sent to the sandbox. Otherwise, it is sent to the sandbox for further analysis/processing. Advantageously, utilizing machine learning to pre-filter a file significantly improves user experience by reducing the overall quarantine time as well as reducing workload in the sandbox. Of course, machine learning cannot replace the sandbox since malicious information from a static file is limited, while the sandbox can get a more accurate picture with dynamic behavior analysis. Further, it follows that the machine learning predictions require high precision due to the impact of a false prediction, i.e., finding a malicious file to be benign.

In the context of inline processing, sandboxing does a great job in detecting malicious files, but there is a cost in latency, which affects user experience. Machine learning can alleviate this issue by giving an earlier verdict on the static files. However, it requires ML to have extremely high precision, since the cost of a false positive and false negative are very high. For example, a benign hospital life-threatening file, if mistakenly blocked due to an ML model's wrong verdict, would cause a life disaster. Similarly, undetected ransomware could cause problems for an enterprise. Therefore, there is a need for a high-precision approach for both benign and malicious files.

The conventional approach to improve precision includes improving the probability threshold to increase precision. A p-value (probability value) is a statistical assessment for measuring the reliability of a prediction, but this does not identify the unreliability of predictions with high probabilities.

A description utilizing machine learning in the context of malware detection is described in commonly-assigned U.S. patent application Ser. No. 15/946,546, filed Apr. 5, 2018, and entitled "System and method for malware detection on a per packet basis," and U.S. patent application Ser. No. 16/377,129, filed Apr. 5, 2019, and entitled "Prudent ensemble models in machine learning with high precision for use in network security," the contents of each are incorporated by reference herein in their entirety.

As described here, the typical machine learning training process collects millions of malware samples, extracts a set of features from these samples, and feeds the features into a machine learning model to determine patterns in the data. The output of this training process is a machine learning model that can predict whether a file that has not been seen before is malicious or not.

Production Data Versus Lab Data

In various examples described herein, the lab data and the production data is for executable files, e.g., Windows executable—Portable Executable (P.E.) at 32- or 64-bit or the like. However, the techniques described herein could be applied to other types of files, such as document files (M.S. Office), Portable Document Format (PDF) files, etc.

Figure 7:
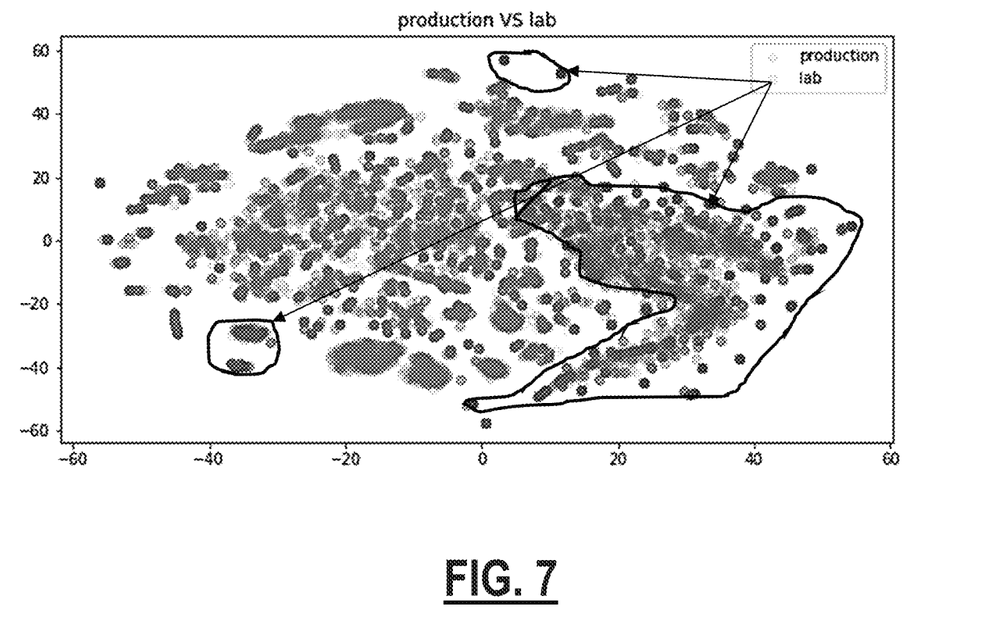
FIG. 7 is a graph that plots features (reduced to two dimensions—the x- and y-axis) of production and lab file samples, indicating their differences.

FIG. 7 is a graph that plots features (on both the x- and y-axis) of file samples. Here, the feature dimensionality was reduced to 2, and each dot represents a sample. Specifically, the circled portions in FIG. 7 represent lab data where the remaining portions are production data. As is seen in FIG. 7, there is a significant data discrepancy in features between the lab data and the production data. As such, any training of a machine learning model with the lab data would be less effective with the production data, due to the feature differences.

To start, a training dataset was built utilizing over 50 million samples from several large public repositories containing malware samples and verdicts from dozens of scanning engines (VirusTotal is an example and probably the most well-known of these repositories). The public repositories are databases include the malware samples themselves as well as the determination, i.e., malicious or benign. As such, the dataset from the public repositories can be used for training data. With the training dataset, a gradient-boosted decision tree model was trained and released into production, in the cloud-based system 100, in monitoring mode for several months. The internal lab test of model efficacy on a validation subset of public files was very promising. But it was determined that the model performed significantly worse on production traffic, because the public file samples were not sufficiently representative of production traffic, as depicted in FIG. 7.

Of note, during the evaluation of the real-time performance of the model, it was discovered that 50-60% of production malware files could be found in the public repositories (some were already included in the training dataset, but many were not); there is also a smaller degree of overlap among benign files. That is, there is a requirement for selecting the samples from the public repositories, and it is not possible to select all of the lab data that also corresponds to production data. This fact, again, is illustrated in FIG. 7. Also, the detection of the production data in the public repositories was based on the unique file identifier, e.g., the MD5 hash.

It was determined that it is possible to match the production data with samples in the public repositories based on the unique file identifier. In this manner, the production data can be used while still maintaining strict data privacy. That is, the training data is fully from the public repositories with the selection of the data in the public repositories based on the unique file identifiers in the production data. Stated differently, the log data in the storage cluster 156 includes the unique file identifiers from the production data, but not the actual samples. It is possible to get the actual samples in the public repositories, thereby maintaining tenant privacy.

Adding the remainder of these production samples into the training dataset produced a more sophisticated model than the first version. However, due to a much smaller scale of variety and amount of these production samples, there was still room for improvement.

Leveraging Public Data for Training Data

The key to further improving the model performance was leveraging the larger set of public data in the public repositories more effectively. As such, the present disclosure includes a technique for learning the similarity between production data samples and public data samples, to emphasize the training instances from the public data that are most similar to production data.

More specifically, the present disclosure leverages dimension reduction techniques such as parametric t-distributed Stochastic Neighbor Embedding (tSNE) and an autoencoder to learn representations of the production data and calculated Euclidean distances of each non-production sample from production samples in the reduced dimensions.

Figure 8:
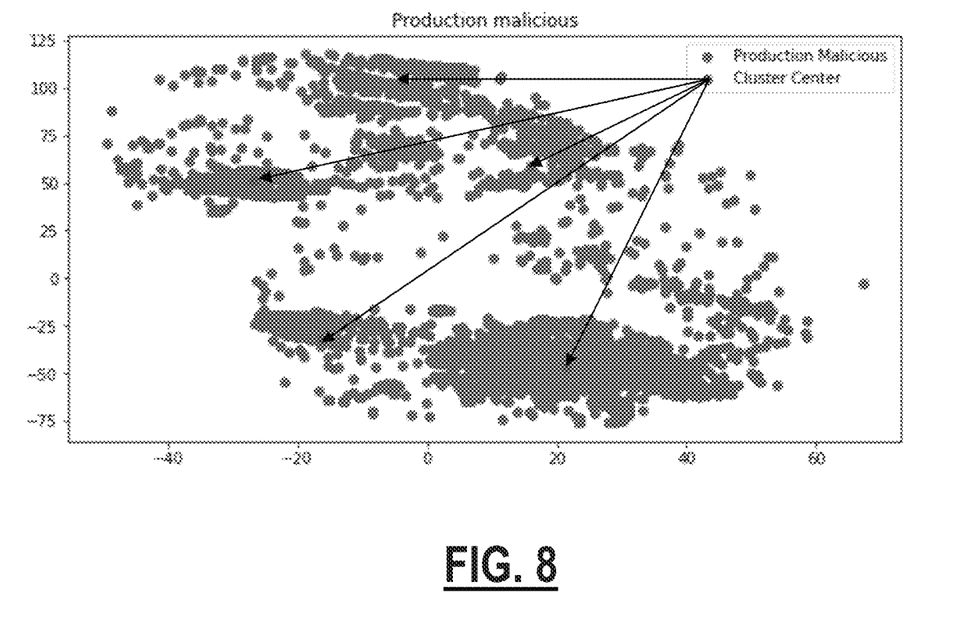
FIG. 8 is a graph illustrating the parametric t-distributed Stochastic Neighbor Embedding (tSNE) where production file samples are represented, and lab file samples similar to production samples can be selected as being closed enough to the centers of production file samples.

It was discovered that a large portion of the training set was poorly representative of the production data, which conforms with the hypothesis that the suboptimal model performance is attributable to the difference between the two datasets. Fortunately, it was discovered that a significant number of the training samples that do not appear in the production data are similar enough to the production samples to be useful in training. FIG. 8 is a graph illustrating the parametric t-distributed Stochastic Neighbor Embedding (tSNE) where lab data samples (highlighted by the lines and arrows) are selected to be similar enough to production samples. Here, the lab data samples are selected to be centered in clusters of production data in the reduced dimensions.

By training the malware classifier with appropriate weights derived from these production similarities, it is possible to improve the recall of malicious Windows executable detection by 10%, while maintaining the same precision.

Figure 9:
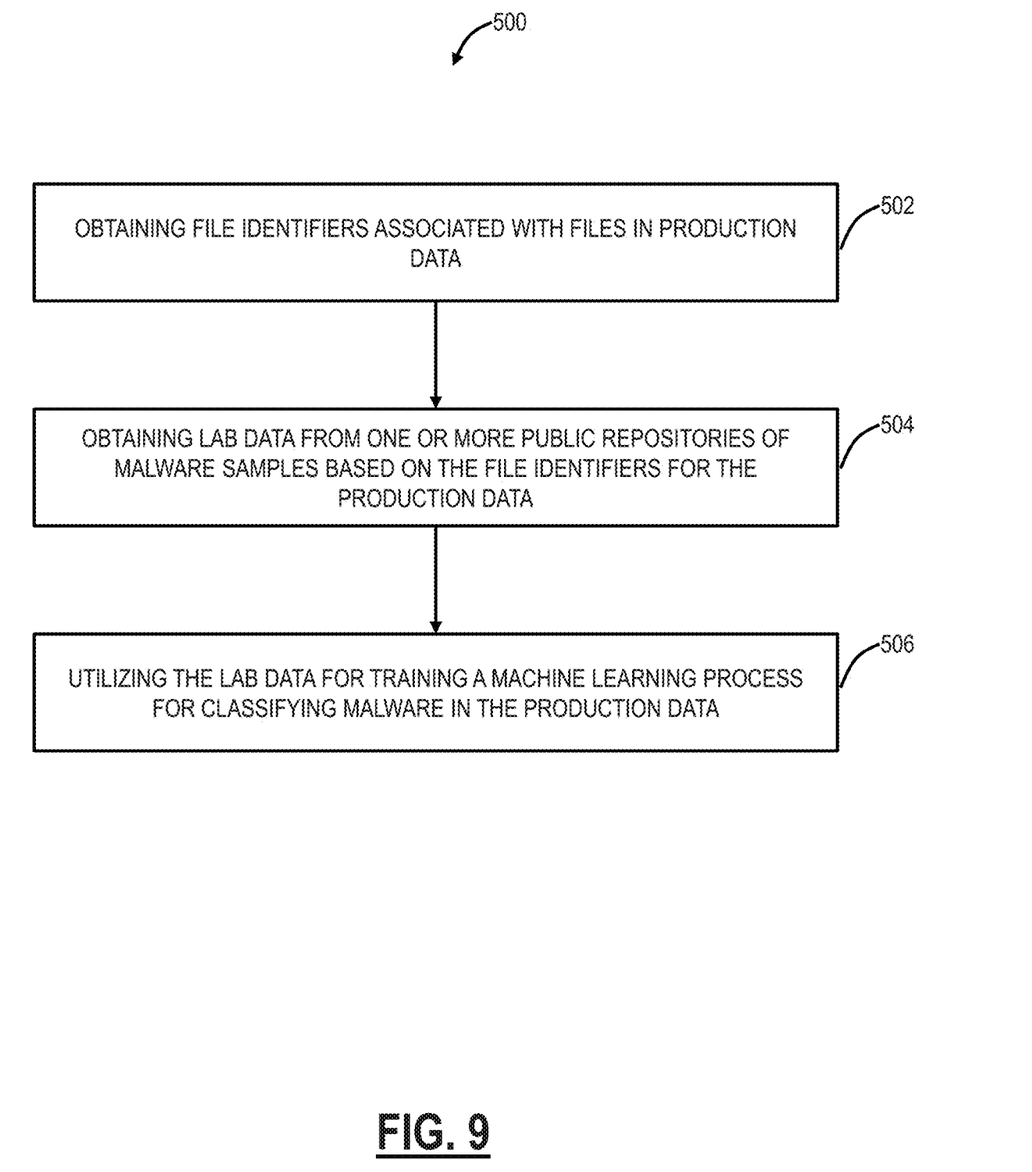
FIG. 9 is a flowchart of a process for building a Machine Learning model without compromising data privacy.

FIG. 9 is a flowchart of a process 500 for building a Machine Learning model without compromising data privacy. The process 500 can be a computer-implemented method, as steps from computer-readable code in a non-transitory computer-readable storage medium, and implemented through a server.

The process 500 includes obtaining file identifiers associated with files in production data (step 502); obtaining lab data from one or more public repositories of malware samples based on the file identifiers for the production data (steps 504); and utilizing the lab data for training a machine learning process for classifying malware in the production data (step 506).

The obtaining file identifiers can be based on monitoring of users associated with the files, and only the file identifiers can be maintained based on the monitoring. The obtaining lab data can include samples from the one or more public repositories matching the corresponding file identifiers for the production data.

The obtaining lab data can include samples from the one or more public repositories that have features closely related to features of the production data. The features of the production data can be determined based on dimension reduction, and the corresponding samples can be selected based on a distance to the production data. The dimension reduction can include parametric t-distributed Stochastic Neighbor Embedding (tSNE) and an autoencoder to learn representations of the production data. The files can be executable files.

Figure 10:
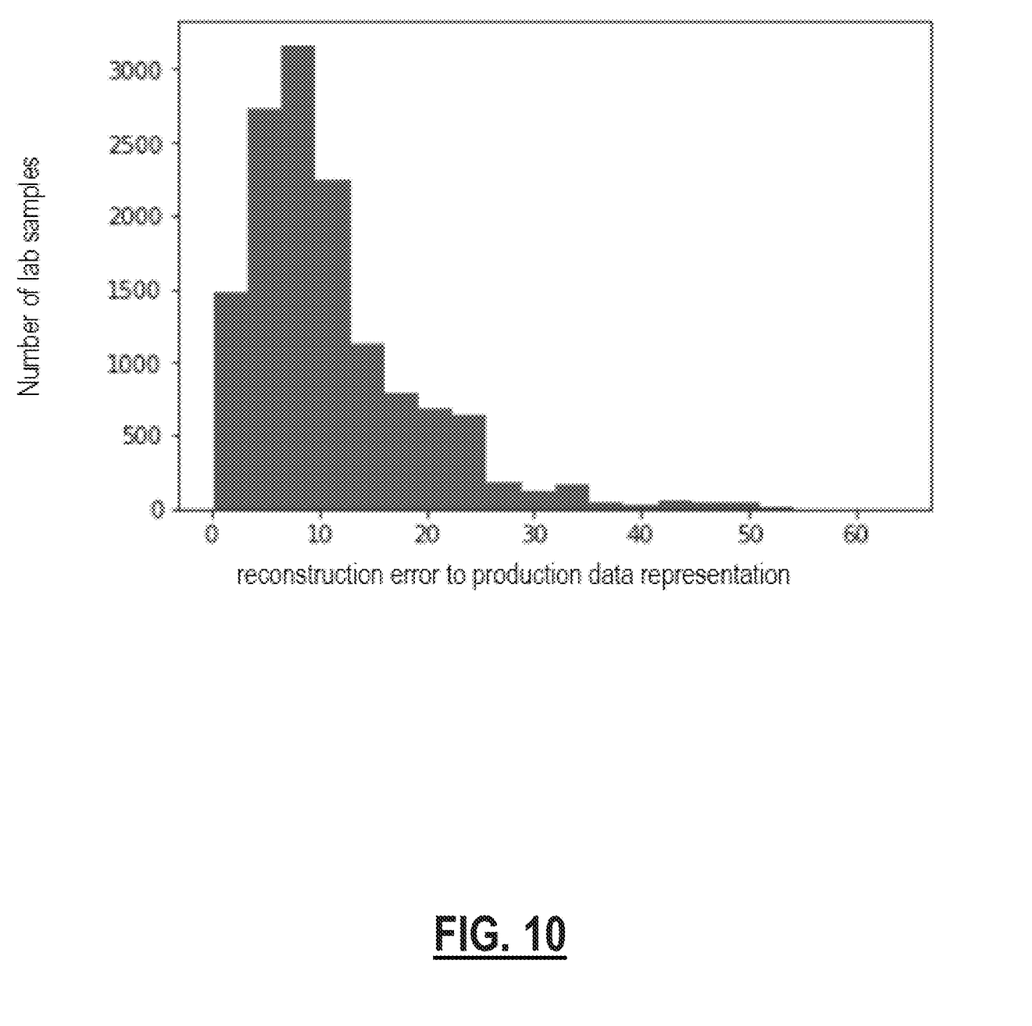
FIG. 10 is a graph illustrating reconstruction error of the lab file samples to production data based on the number of lab samples.

FIG. 10 is a graph illustrating reconstruction error of the lab file samples to production data based on the number of lab samples.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable storage medium having computer-readable code stored thereon for programming one or more processors to perform steps of:
obtaining file identifiers associated with files in production data, wherein the production data is live, real traffic that includes both benign and malicious data;
obtaining lab data from one or more public repositories of malware samples based on similarities of the file identifiers obtained from the live, real production data and the lab data;
deriving weights based on similarities of the production data and the obtained lab data; and
utilizing the derived weights and the obtained lab data as training data for training a machine learning process for classifying malware in the production data, wherein the training includes utilizing the derived weights for improving a recall of the machine learning process.

2. The non-transitory computer-readable storage medium of claim 1, wherein the obtaining file identifiers is based on monitoring of users associated with the files, and wherein only the file identifiers are maintained in log data.

3. The non-transitory computer-readable storage medium of claim 1, wherein the obtaining lab data includes samples from the one or more public repositories matching the corresponding file identifiers for the production data.

4. The non-transitory computer-readable storage medium of claim 1, wherein the obtaining lab data includes selecting samples from the one or more public repositories that have features closely related to features of the production data.

5. The non-transitory computer-readable storage medium of claim 4, wherein the features of the production data are determined based on dimension reduction, and wherein the corresponding samples are selected based on being centered in clusters of production data in resulting reduced dimensions.

6. The non-transitory computer-readable storage medium of claim 5, wherein the dimension reduction includes parametric t-distributed Stochastic Neighbor Embedding (tSNE) and an autoencoder to learn representations of the production data.

7. The non-transitory computer-readable storage medium of claim 1, wherein the files are executable files.

8. A server comprising:
one or more processors and
memory storing computer-executable instructions that, when executed, cause the one or more processors to
obtain file identifiers associated with files in production data, wherein the production data is live, real traffic that includes both benign and malicious data;
obtain lab data from one or more public repositories of malware samples based on similarities of the file identifiers obtained from the live, real production data and the lab data;
deriving weights based on similarities of the production data and the obtained lab data; and
utilize the derived weights and the obtained lab data as training data for training a machine learning process for classifying malware in the production data, wherein the training includes utilizing the derived weights for improving a recall of the machine learning process.

9. The server of claim 8, wherein the file identifiers are obtained based on monitoring of users associated with the files, and wherein only the file identifiers are maintained in log data.

10. The server of claim 8, wherein the lab data includes samples from the one or more public repositories matching the corresponding file identifiers for the production data.

11. The server of claim 8, wherein the lab data includes selected samples from the one or more public repositories that have features closely related to features of the production data.

12. The server of claim 11, wherein the features of the production data are determined based on dimension reduction, and wherein the corresponding samples are selected based on being centered in clusters of production data in resulting reduced dimensions.

13. The server of claim 12, wherein the dimension reduction includes parametric t-distributed Stochastic Neighbor Embedding (tSNE) and an autoencoder to learn representations of the production data.

14. The server of claim 8, wherein the files are executable files.

15. A method comprising:
obtaining file identifiers associated with files in production data, wherein the production data is live, real traffic that includes both benign and malicious data;
obtaining lab data from one or more public repositories of malware samples based on similarities of the file identifiers obtained from the live, real production data and the lab data;
deriving weights based on similarities of the production data and the obtained lab data; and
utilizing the derived weights and the obtained lab data as training data for training a machine learning process for classifying malware in the production data, wherein the training includes utilizing the derived weights for improving a recall of the machine learning process.

16. The method of claim 15, wherein the obtaining file identifiers is based on monitoring of users associated with the files, and wherein only the file identifiers are maintained in log data.

17. The method of claim 15, wherein the obtaining lab data includes samples from the one or more public repositories matching the corresponding file identifiers for the production data.

18. The method of claim 15, wherein the obtaining lab data includes selecting samples from the one or more public repositories that have features closely related to features of the production data.

19. The method of claim 18, wherein the features of the production data are determined based on dimension reduction, and wherein the corresponding samples are selected based on being centered in clusters of production data in resulting reduced dimensions.

20. The method of claim 15, wherein the files are executable files.

\* \* \* \* \*